(12) United States Patent
Fujishita

(10) Patent No.: US 6,988,013 B1
(45) Date of Patent: Jan. 17, 2006

(54) METHOD AND APPARATUS FOR AUDIO SIGNAL PROCESSING (75) Inventor: Kaneaki Fujishita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/600,217

(22) PCT Filed: Nov. 10, 1999

(86) PCT No.: PCT/JP99/06240

§ 371 (c)(1),
(2), (4) Date: Dec. 8, 2000

(87) PCT Pub. No.: WO00/30103

PCT Pub. Date: May 25, 2000

(30) Foreign Application Priority Data

Nov. 13, 1998 (JP) ............................... P10-323862

(51) Int. Cl.
G06F 17/00 (2006.01)
H04B 15/00 (2006.01)
G10L 21/00 (2006.01)

(52) U.S. Cl. ........................ 700/94; 704/500; 704/504; 381/94.5

(58) Field of Classification Search ................. 701/94; 704/512, 233, 500–504, 230, 200.1; 381/94.5; 700/94
See application file for complete search history.

(56) References Cited

U.S. PATENT DOCUMENTS

| | | | | |
|---|---|---|---|---|
| 5,343,456 A | * | 8/1994 | Maeda | 369/59 |
| 5,596,647 A | * | 1/1997 | Wakai et al. | 381/77 |
| 5,625,611 A | * | 4/1997 | Yokota et al. | 369/47.12 |
| 5,692,102 A | * | 11/1997 | Pan | 704/230 |
| 5,742,930 A | * | 4/1998 | Howitt | 704/503 |
| 5,787,399 A | * | 7/1998 | Lee et al. | 704/270 |
| 5,822,370 A | * | 10/1998 | Graupe | 375/240 |
| 5,884,269 A | * | 3/1999 | Cellier et al. | 704/501 |
| 5,890,124 A | * | 3/1999 | Galbi | 704/501 |
| 6,047,036 A | * | 4/2000 | Schnizlein | 375/351 |
| 6,076,062 A | * | 6/2000 | Van Steenbrugge | 704/500 |
| 6,141,597 A | * | 10/2000 | Botzko et al. | 700/94 |
| 6,201,487 B1 | * | 3/2001 | Park et al. | 341/94 |
| 6,694,030 B1 | * | 2/2004 | Van Steenbrugge | 381/94.5 |

* cited by examiner

Primary Examiner—Laura A. Grier
(74) Attorney, Agent, or Firm—Jay H. Maioli (57) ABSTRACT

An audio signal processing method wherein it is detected whether the data supplied from an optical disk reproduction apparatus or the like has continuous zero data for a predetermined period of time, and in the case where zero data continue for the predetermined period of time, it is determined that compressed audio data is involved, and the supplied data is decoded.

4 Claims, 8 Drawing Sheets

FIG. 1

FIG. 2A
AUDIO DATA

FIG. 2B
COMPRESSED
AUDIO
DATA

METHOD AND APPARATUS FOR AUDIO SIGNAL PROCESSING

TECHNICAL FIELD

The present invention relates to an audio signal processing method and an audio signal processing apparatus. In particular, this invention is applicable to an audio signal processing apparatus for decoding audio data, an audio signal processing method and an optical disk apparatus.

BACKGROUND ART

The digital data (IEC61937 format) output from a digital audio terminal of a DVD (digital versatile disk) reproduction apparatus includes, like in the conventional CD (compact disk), compressed audio data of various formats such as AC-3 (trade mark) proposed by Dolby, MPEG and dts (trade mark) proposed by DTS, in addition to the linear PCM (pulse code modulation). An external decoder unit connected to the DVD reproduction apparatus, therefore, is required to determine these data formats and accurately process the data.

These compressed audio data, as viewed from the decoder unit, are simply the conventional 16-bit PCM data, and until the sync signal in the burst preamble existing in the 16-bit data is detected, it cannot be determined whether the particular data are actually PCM data that can be demodulated or the compressed audio data requiring the decode processing such as expansion processing.

This determination is possible to some degree for the DVD reproduction signal by detecting the PCM flag or the channel status on the IEC61937 format. The CD recorded in the dts format recently marketed in the U.S., however, is handled as a normal CD (compact disk) also in the DVD reproduction apparatus, and therefore the PCM data is determined according to the PCM flag with a risk.

In view of this, in the conventional decoder apparatus, the bit pattern of input data is always compared with a conceivable sync pattern, and upon detection of any sync signal indicating compressed audio data, the audio decoding of the PCM data is suspended, and if the data can be decoded, the decoder apparatus is activated, thereby preventing the noise which otherwise might be caused by the decoding error of the compressed audio data.

Japanese Unexamined Patent Publication No. 5-316056 discloses an audio signal processing apparatus which, in order to reduce noises and click sound, detects the number of data input of a value not contained in the conversion rule, and in the case where the detection result reaches a predetermined value or more, controls the output sound into muted status.

Japanese Unexamined Patent Publication No. 8-287613 discloses an output control system of a switchable audio channel, in which in order to suppress noises at the time of switching the audio channel, one (audio channel 1) of a plurality of types of audio data is changed to another type (audio channel 2), while the audio output of audio channel 2 is faded in after fading out the audio output of audio channel 1.

DISCLOSURE OF THE INVENTION

However, the conventional algorithm for detection of the compressed audio data described above has the following disadvantages.

First, in the case where the DVD reproduction apparatus performs such an operation as a trick play including what is called the double-speed reproduction for reproducing data at a speed twice as high as the normal reproduction speed, rapid feed or skip, the continuity of the data stream output from the DVD is lost. Therefore, the sync signal is lost, and in the worst case, the data may be recognized erroneously as PCM data.

Secondly, in the rapid feed mode of the dts CD or dts LD (optical video disk having the sound recorded therein by dts scheme) handled as normal CD, the digital data segmented regardless of the data stream are output as PCM data. As viewed from the decoder unit, therefore, the data cannot be discriminated from the PCM data, with the result that a noise is output.

Thirdly, in case of the advent of a new format with a different sync signal specification, no protective measure is available and a noise may be output.

The audio signal processing apparatus described in Japanese Unexamined Patent Publication No. 5-316056 relates to the processing of audio signal in the case where the flag cannot be detected or an error cannot be corrected when each plurality of digital data obtained by sampling the audio signal are transmitted with an error correcting signal, and fails to take into consideration the detection for decoding the compressed audio data.

The output control system for a switchable audio channel described in Japanese Unexamined Patent Publication No. 8-287613 is for preventing noises at the time of switching the audio channel in reproducing the audio data of a plurality of channels, and also fails to take into consideration the detection for decoding the compressed audio data.

The present invention has been achieved in consideration of the aforementioned points, and is intended to propose an audio signal processing apparatus, an audio signal processing method and an optical disk apparatus which can suppress noises when the compressed audio digital signal data are input.

In order to obviate this problem, in an audio signal processing method according to this invention, it is detected whether the supplied data contain consecutive zero data for a predetermined period of time, and in the case where zero data are continued for the predetermined period of time, it is determined that the audio data are compressed and the supplied data are decoded.

Also, an audio signal processing apparatus according to this invention comprises detection means for detecting whether the supplied data has successive zero data for a predetermined period of time, determination means for determining that the supplied data is a compressed audio data in the case where the result of detection by the detection means shows that zero data continue for the predetermined period of time, and decode means for decoding the supplied data based on the result of determination by the determination means.

An audio signal processing method and an audio signal processing apparatus according to this invention have the following functions.

As long as nothing is reproduced in the optical disk apparatus, zero data are detected as a first mode, and the stream detector in the detection means outputs continuous zero data.

At the time of reproduction from the optical disk apparatus, a second mode in which the input data cannot be determined prevails and the output is muted for a predetermined period following the time point when data other than zero is first input to the detection means.

In the case where any sync signal is detected during the predetermined period of the second mode, a decode program corresponding to the sync signal is initiated, and the compressed digital audio data is decoded as a third mode.

In the case where a predetermined number of successive zero data are detected during a predetermined period of time in the second mode, the count on a counter for counting the predetermined period is cleared, and from that point, the second mode is maintained for a predetermined period of time.

Only upon the lapse of the predetermined period of time in second mode during which the detection is not made, the determination means judges that the input data is digital audio data, and immediately starts decoding the digital audio data in the decode means as a fourth mode. In the process, the data for the past predetermined period of time is stored in a buffer, so that the digital audio data can be reproduced without interruption.

Assume, on the other hand, that the input data contains zero data continuously for a maximum period of time during decoding of the digital compressed audio data by the decode means in third mode or during the decoding of the digital audio data by the decode means in the fourth mode. It is determined that the operation of the optical disk apparatus has stopped or the disk has been replaced, and the process proceeds to the zero data detection mode represented by the first mode to repeat the mode described above.

BEST MODE FOR CARRYING OUT THE INVENTION

An audio signal processing apparatus according to an embodiment of the invention will be described in detail below with reference to the drawings appropriately.

Figure 1:
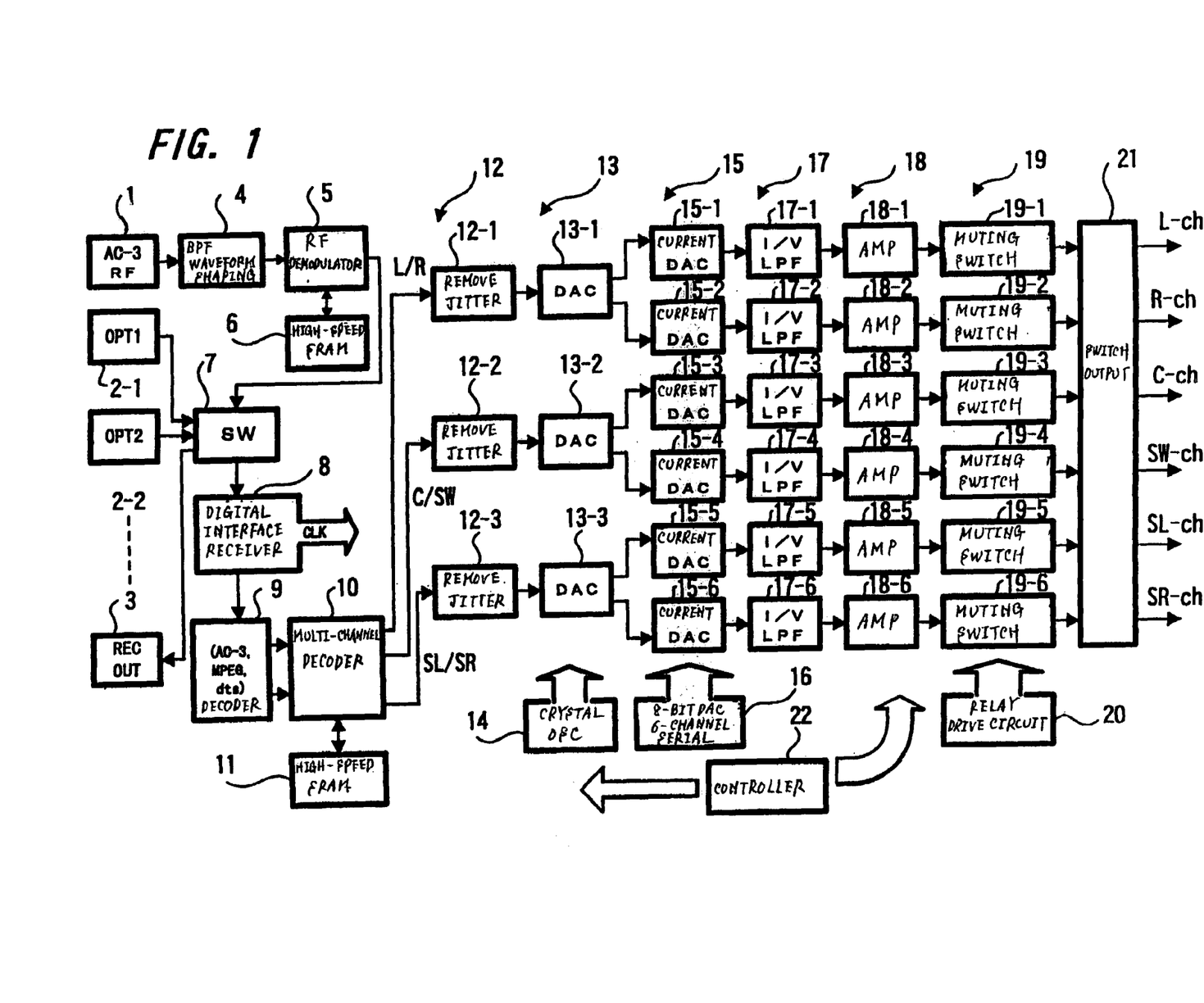
FIG. 1 is a block diagram showing a configuration of an audio signal processing apparatus according to an embodiment of the present invention.

FIG. 1 is a block diagram showing a configuration of an audio signal processing apparatus of an optical disk reproduction apparatus according to an embodiment of the invention.

The audio signal processing apparatus according to the invention shown in FIG. 1 is for outputting the audio signal by decoding the digital audio signal. In order to suppress the noise when the compressed audio digital data are input, this apparatus detects the continuous zero data for several samples constituting the feature of the compressed audio data, suspends the audio decoding when a signal or data other than the digital signal of PCM type, i.e. the digital audio signal not compressed, decodes the compressed data and mutes the audio output.

The signal read by the optical pickup from the DVD as a disk-shaped recording medium is converted into an electrical signal and amplified in an optical disk reproduction unit, and the analog signal is converted into a digital signal by an A/D converter and supplied to a signal processing circuit. In the signal processing circuit, the signal read from the DVD is demodulated, the error corrected, and the process performed for demodulation against the 8/16 modulation, thereby outputting an audio stream. This audio stream is supplied to an audio signal processing apparatus making up a decode unit shown in FIG. 1. This audio stream contains the audio data compressed or not compressed in the format of AC-3, MPEG or dts, i.e. PCM digital audio data.

The PCM digital data is a non-compressed digital audio data of 48 kHz or 96 kHz in sampling frequency. AC-3 is a compression scheme used for SR-D (Dolby Stereo Digital, trade mark). MPEG (Moving Picture Experts Group) is defined up to the MPEG2 expansion bit stream to handle a multi-channel. The compression scheme dts (digital theater systems, trade mark) corresponds to the digital multi-tracks.

In FIG. 1, the compressed audio data of AC-3 format reproduced from the DVD, for example, is supplied to the RF circuit 1 of AC-3 for high-frequency wave amplification, shaped in a BPF (bandpass filter) waveform shaping circuit 4, high-frequency modulated in a RF demodulator 5 and a high-speed SRAM 6, and supplied to a switch (SW) 7. The compressed audio data in dts format or MPEG and the PCM digital audio data are supplied to a switch (SW) 7 through optical signal input circuits OP1 (2-1), OP2 (2-2) and . . . . The signal supplied from the RF demodulator 5 and each optical signal input circuit through the switch (SW) 7 is supplied to a recording output circuit (REC OUT) 3 and recorded, for example, in the optical disks of an optical disk recording/reproduction apparatus.

In this way, the digital audio signal reproduced from the DVD is selected by the switch (SW) 7 and demodulated as an audio sample in a digital interface receiver 8. This demodulated signal is supplied to a decoder 9. The decoder 9 is configured with a DSP (digital signal processor), which after detection of a stream as described later, expands and decodes the compressed audio data of AC-3, MPEG or dts format, while at the same time decoding the PCM digital data. The audio compression in the encode operation is elimination of the redundant portion due to the masking effect, and therefore the decoding of the compressed audio data is a process for restoring the compressed data to the original form.

The two-channel audio signal decoded by the decoder 9 is converted into digital audio signals of six channels including L (left), R (right), C (center), SW (subsidiary low), SL (subsidiary left) and SR (subsidiary right) by a multi-channel decoder 10 and a high-speed SRAM 11. The six-channel audio signals of L, R, C, SW, SL and SR have the jitter thereof removed by jitter removing circuits 12-1, 12-2, 12-3, respectively, and converted into six-channel analog audio signals of L, R, C, SW, SL, SR using the clock from a crystal oscillation circuit (OSC) 14 by D/A conversion circuits 13-1, 13-2, 13-3, respectively.

The six-channel analog audio signals of L, R, C, SW, SL and SR are converted into the magnitude of output current corresponding to the 8-bit serial signal by current D/A conversion circuits 15-1, 15-2, 15-3, 15-4, 15-5, 15-6, respectively, and a reference signal 16, and converted from current to voltage by I (current)/V (voltage) conversion and LPFs (low pass filters) 16-1, 16-2, 16-3, 16-4, 16-5, 16-6, have the signal in the audio area retrieved, amplified in amplifiers 17-1, 17-2, 17-3, 17-4, 17-5, 17-6, have the outputs thereof suspended by muting switches 18-1, 18-2, 18-3, 18-4, 18-5, 18-6 including relays and a relay drive circuit 20 while the data are decoded by the decoder 9, and output through an output switching circuit 21 including a relay. The operation of each of the circuits described above is controlled by a controller 22.

Figure 2A:
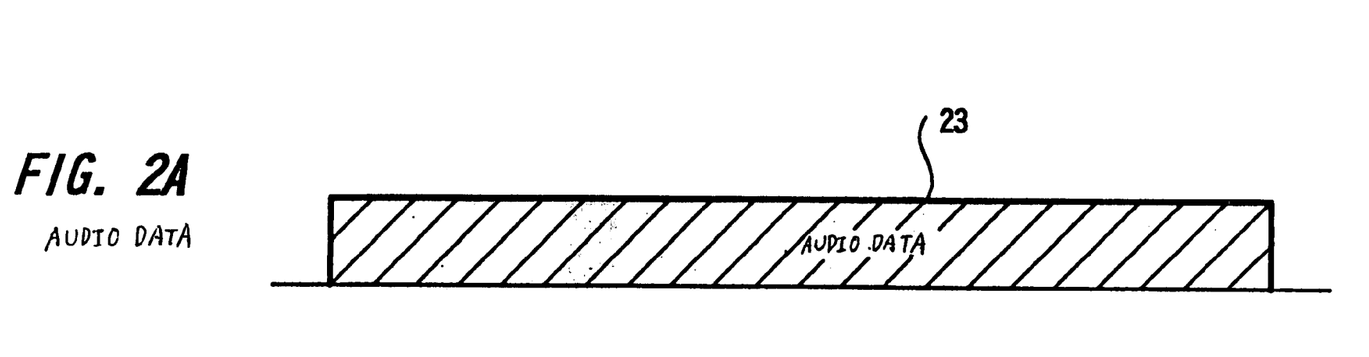
FIG. 2 is a diagram showing the audio data and the compressed audio data according to an embodiment of the invention.
Figure 2B:
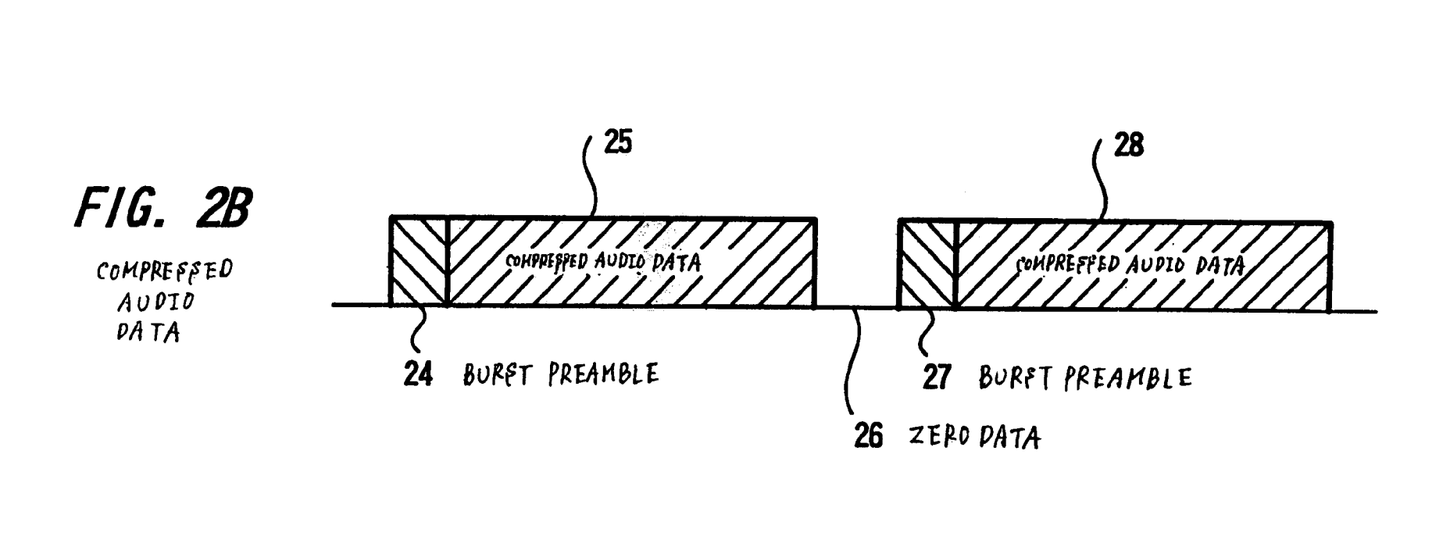

FIGS. 2A and 2B are diagrams showing the audio data and the compressed audio data according to this embodiment.

The audio PCM data 23 shown in FIG. 2A is basically the result of sampling the sound existing in the natural world, and therefore very rarely continues to be zero for a certain period of time. Even if a continuously zero data exists, the probability of the pattern being repeated over a predetermined period of time is substantially zero except for the muted state lacking the sound.

The compressed audio data 25, 28 shown in FIG. 2B basically exist in bursts with burst preambles 24, 27, and have the feature of being always accompanied by a certain period of time during which the zero data 26 exists. In the IEC61937 format which is a digital audio specification of DVD, the sync signal itself has 4-sample zero data, and therefore there is always a period during which continuous zero data 26 of at least 4 samples appear.

According to this embodiment, not only the conventional sync signal but also the continuous zeros constituting the feature of the compressed audio data based on the IEC61937 format is detected as a criterion for the compressed audio data in the decoder 9 thereby to detect the stream of the compressed audio data.

Figure 3:
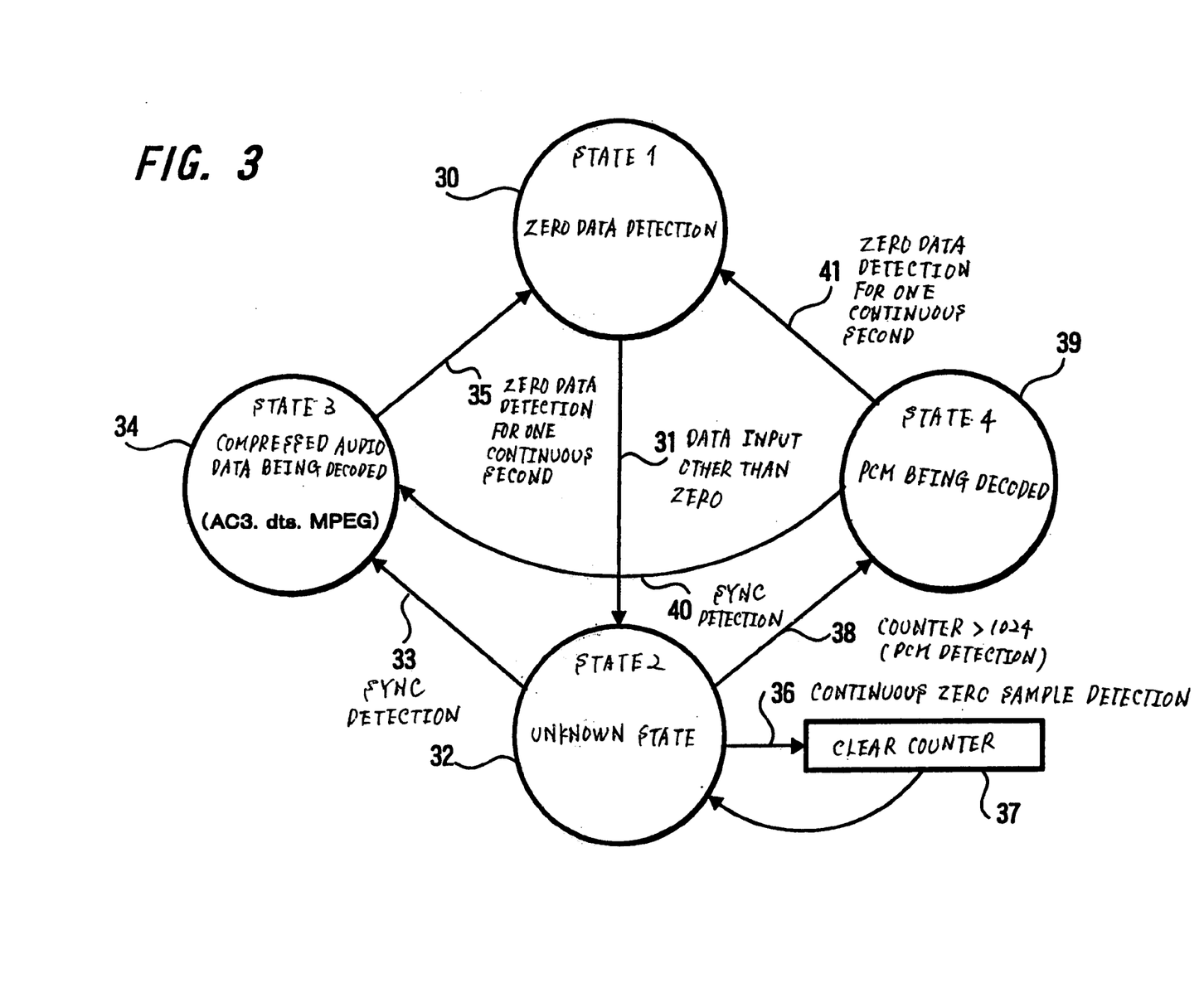
FIG. 3 is a state transition diagram of a decoder according to an embodiment of the invention.

FIG. 3 is a state transition diagram of the decoder 9 according to this embodiment.

In FIG. 3, in the case where nothing is reproduced in the optical disk reproduction apparatus, as shown in state 1 (30), the zero data detection state basically prevails, so that the continuous zero data is output from the stream detector of the decoder 9.

In the case where the DVD is reproduced in the optical disk reproduction apparatus from this state 1 (30), as indicated first by reference numeral 31, the UNKNOWN state prevails in which the input data cannot be determined as indicated by state 2 (32) during the 1024 sample periods after the time point when the data other than zero is input to the decoder 9, and the output remains muted by the muting switch 19.

In the case where some sync signal is detected as indicated by reference numeral 33 during the 1024 sample periods in the UNKNOWN state as shown in state 2 (32), the decode program corresponding to the detected sync signal is started. Thus, as shown in state 3 (34), the compressed audio data is decoded based on AC-3, MPEG, dts, etc. Also, when the decode process is started, the muted state by the muting switch 19 is canceled, and the audio signal based on the output data from the decoder 9 is output. The canceling operation or the muting operation of the muting switch 1 is controlled by the controller 22 described above.

If three samples of continuous zero data are detected as indicated by reference numeral 36 during the 1024 sample periods of the UNKNOWN state indicated by state 2 (32), the count of the counter for counting the 1024 samples is cleared as indicated by reference numeral 37, and further the UNKNOWN state for 1024 samples is maintained from that point.

Only at the time point when the sync signal is not detected during the 1024 sample periods from the UNKNOWN state indicated by state 2 (32) as designated by reference numeral 38, it is determined that the input data is the PCM data and, as indicated by state 4 (39), the PCM data immediately begins to be decoded. In the process, the data for the past 1024 samples are stored in the buffer memory in the decoder 9, so that the audio data of PCM scheme can be reproduced without interruption. The muted state of the muting switch 19 is canceled and the audio signal is output based on the data output from the decoder 9.

In the case where the input data indicated by reference numeral 35 or 41 remains zero data for a long time, say, one second during the decoding of the audio data compressed by AC-3, MPEG or dts scheme indicated by state 3 (34) or during the decoding of PCM data indicated by state 4 (39), then it is determined that the operation of the optical disk reproduction apparatus has stopped or the disk has been replaced, and the process is transferred to the zero data detection state shown in the first state 1 (30). This state transfer is repeated. In the process, the muting switch 19 is switched to muting mode.

FIGS. 4 to 8 are flowcharts showing the operation of stream detection of the decoder 9 according to this embodiment. These flowcharts show the detailed operation of the stream detection unit of the decoder 9.

Figure 4:
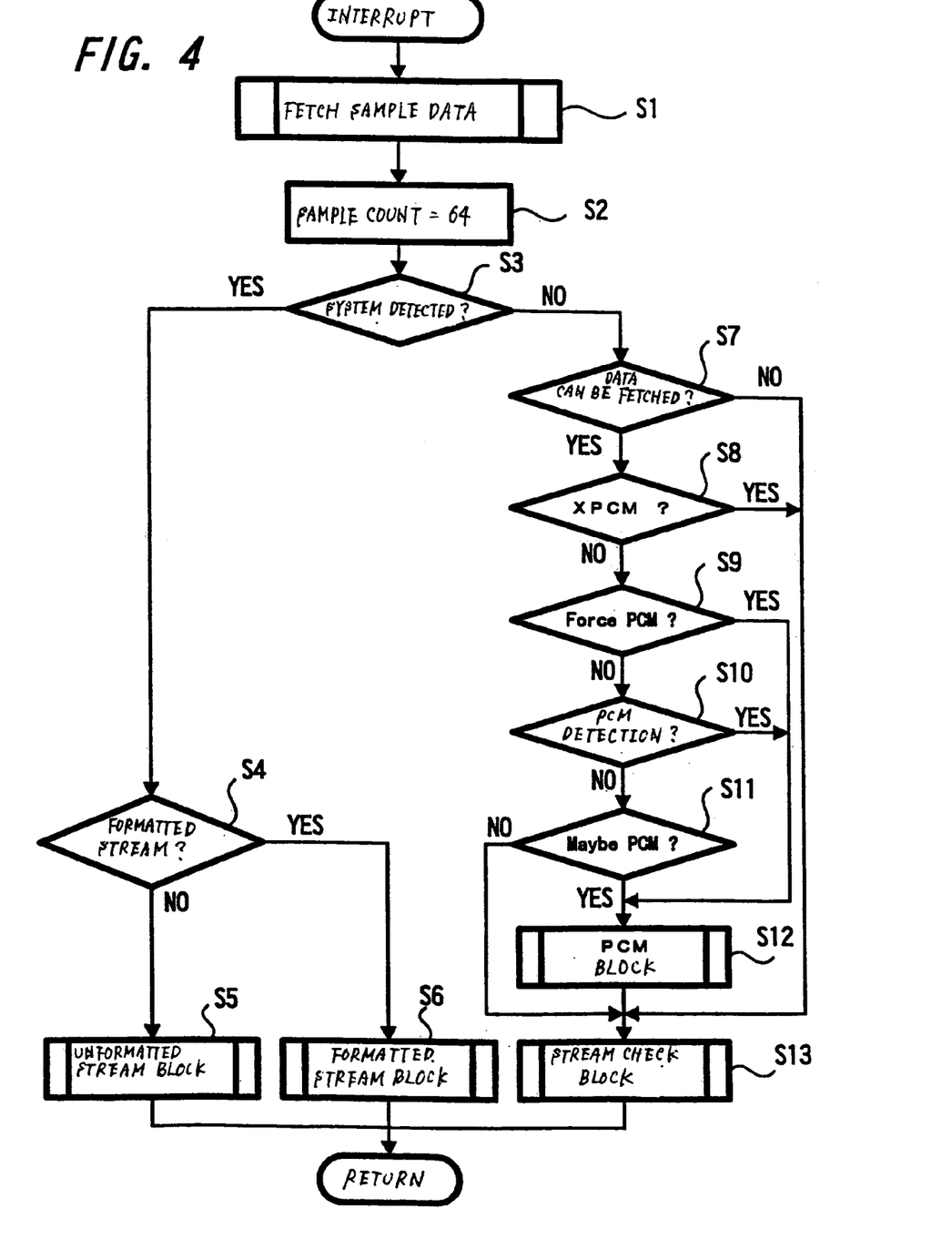
FIG. 4 is a flowchart showing the stream detecting operation (interrupt operation) according to an embodiment of the invention.

In FIG. 4, assume that the signal reproduced from the DVD is supplied to the decoder 9 through the switch (SW) 7, for example, and the interrupt operation is started. At step S1, the sample data are fetched, and 64 samples are counted at step S2. At step S3, it is determined whether the compressed audio data stream is involved or not based on the IEC61937 format described above, for example. In the case where the digital data supplied at step S3, i.e. the data stream is compressed in audio form, the process proceeds to step S4 for determining whether the format stream is involved or not. In the case where it is determined that no formatted stream is involved at step S4, the process proceeds to the unformatted stream block S5, while in the case where the formatted stream is involved, the process proceeds to the formatted stream block S6 and returns.

In the case where the data stream of the compressed audio data is not involved at step S3, the process proceeds to step S7 for determining whether the data can be fetched or not. In the case where the data can be fetched, the process proceeds to step S8 for determining whether the XPCM (the channel status of the data stream is not PCM data) flag is set or not. In the case where the channel status is not PCM data at step S8, the process proceeds to step S9 for determining whether the ForcePCM (PCM data is most likely to be involved) flag is set or not. In the case where the PCM data is most unlikely to be involved, the process proceeds to step S10 for determining whether the PCM detection flag is set or not. In the case where it is detected that the PCM detection flag is not set at step S10, the process proceeds to step S11 for determining whether the auxiliary MaybePCM (probable PCM) flag is set or not. In the case where it is detected at step S11 that the PCM flag is probably set, the process proceeds to step S12, so that the process for transfer of the PCM data to the process of the subsequent stages is performed in the PCM block.

Figure 6:
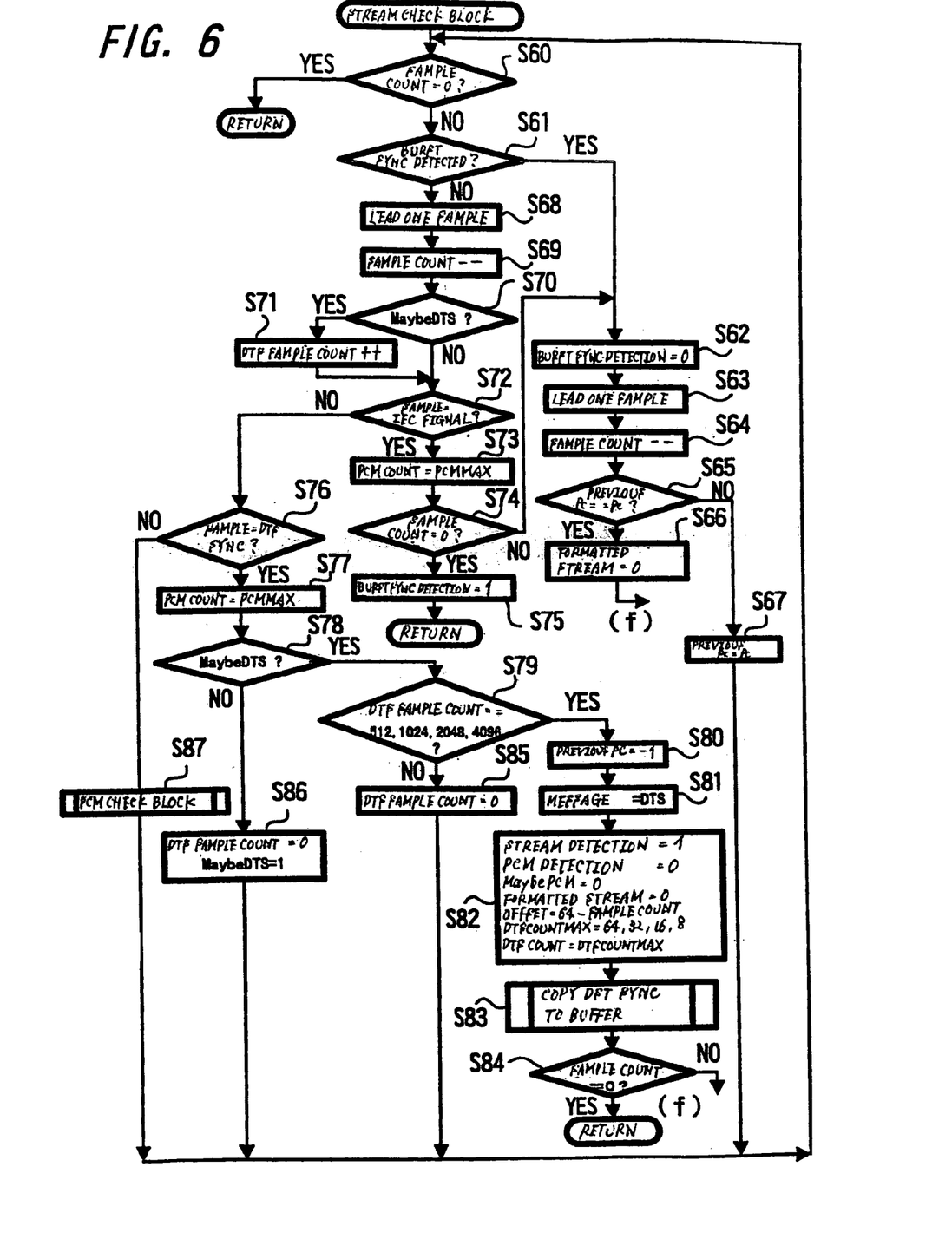
FIG. 6 is a flowchart showing the stream detecting operation (stream check block) according to an embodiment of the invention.

In the case where the probability of being PCM data is high at step S9, or when it is detected at step S10 that the PCM detection flag is set, the process proceeds to step S12, and the process for transfer of the PCM data is performed in the PCM block. In the case where it is not probably the PCM data at step S11, the process proceeds to step S13 and the process of the stream check block is performed. In the case where the data cannot be fetched at step S7 or in the case where the channel status is not PCM data at step S8, the process proceeds to step S13 where the process of the stream check block shown in FIG. 6 is performed followed by returning.

Figure 5:
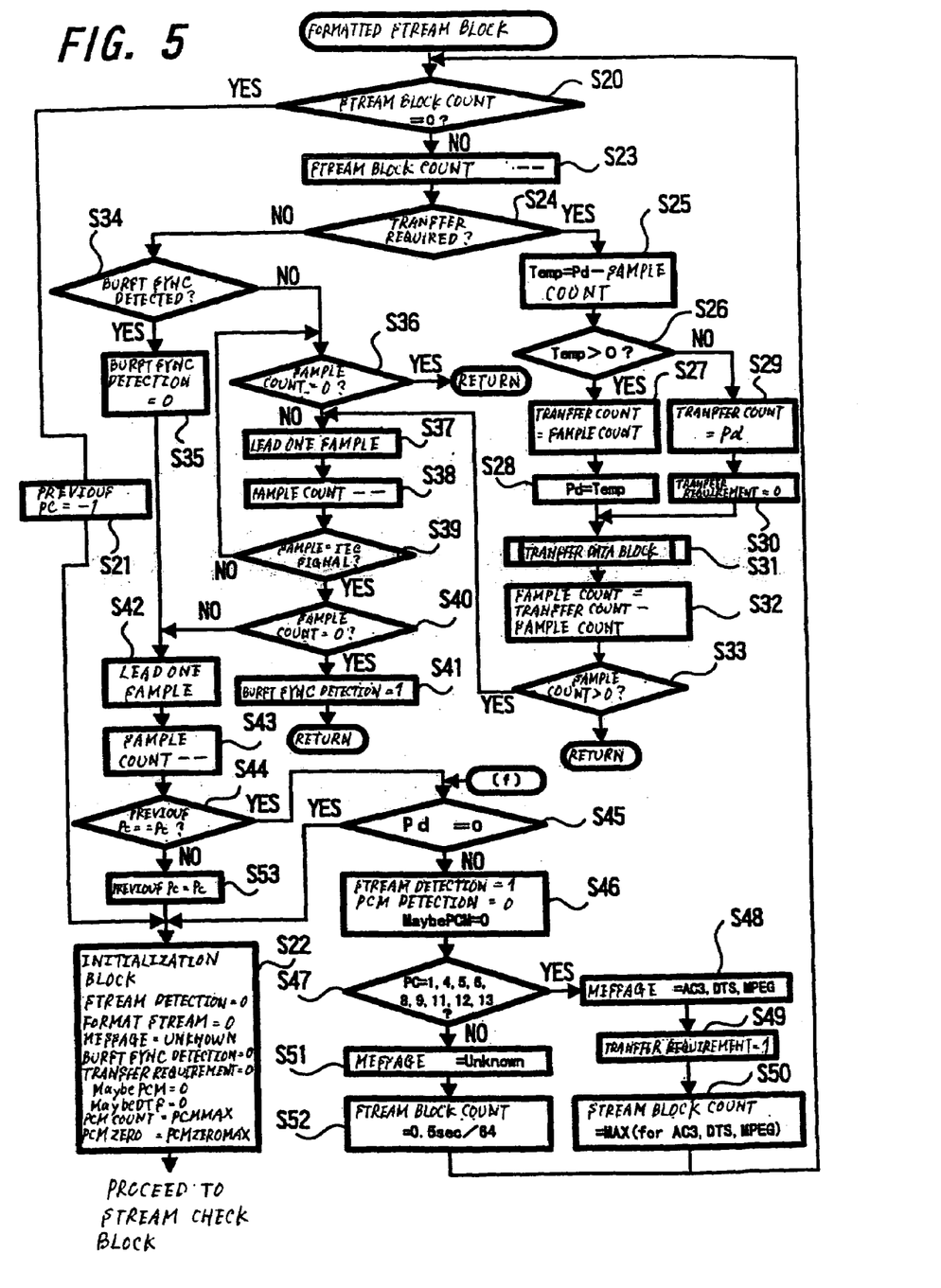
FIG. 5 is a flowchart showing the stream detecting operation (formatted stream block) according to an embodiment of the invention.

FIG. 5 shows a subroutine of the format stream block of step S6 shown in FIG. 4. The formatted stream block in FIG. 5 is the process performed in the case where the input data is the audio data compressed by the AC-3, dts or MPEG scheme and the decoder 9 is decoding the audio data according to AC-3, dts or MPEG scheme.

In FIG. 5, when the formatted stream block is started, it is determined at step S20 whether the stream block count ==0 (whether 0s are counted continuously) or not. In the case where the 0s are counted continuously, the process proceeds to step S21, and the burst preamble Pc for the preceding sampling is set to −1. At step S22, the value of each flag in the initialization block is initialized to 0 for stream detection, 0 for the formatted stream, UNKNOWN for the message, 0 for the burst sync detection, 0 for required transfer, 0 for MaybePCM, 0 for MaybeDTS, PCMMAX for PCM count and PCMZEROMAX for PCM zero. In the process, the UNKNOWN state shown in state 2 (32) of FIG. 3 prevails. Then the process proceeds to the stream check block shown in FIG. 6. Step S20 corresponds to the zero data detection of state 1 (3) shown in FIG. 3.

In the case where the stream block count value is not continuous 0s at step S20, the process proceeds to step S23 for stream count −− (decrement). At step S24, it is determined whether the transfer is required or not, and if the transfer is required, the process proceeds to step S25 and Temp is set to {Pd (indicating the frame length of the burst preamble)—sample count} as a provisional value. Further, the process proceeds to step S26 for determining whether Temp>0 or not. In the case where Temp>0 at step S26, the transfer count is set to the sample count at step S27, Pd is set to Temp at step S28, and the process proceeds to step S31 for processing the transfer data block. Unless Temp is larger than 0 at step S26, the transfer count is set to Pd at step S29 and the required transfer is set to 0 (cleared) at step S30. Then the process proceeds to step S31 for processing the transfer data block. Step S31 indicates the state in which the compressed audio data of state 3 (34) shown in FIG. 3 is being decoded or the PCM data of state 4 (39) is being decoded.

At step S32, the sample count is set to the transfer count less the sample count, and the process proceeds to step S33 for determining whether the sample count is larger than 0 or not. If the sample count is larger than 0 at step S33, the process proceeds to step S37 described later, while when the sample count is not larger than 0, the process is returned.

Unless the transfer is required at step S24, the process proceeds to step S34 for determining whether the burst sync is detected or not. Steps S34 to S47 represent the sync detection 40 or the sync detection 33 shown in FIG. 3. In the case where the burst sync is detected at step S34, the process proceeds to step S35 for setting the burst sync detection to 0 (clear). Unless the burst sync is detected at step S34, on the other hand, the process proceeds to step S36 for determining whether the sample count == 0 (whether continuous 0s are counted) or not. If the sample count == 0, i.e. 0s are counted continuously, the process is returned. Unless the sample count == 0, i.e. if continuous 0s are not counted at step S36, the process is advanced by one sample at step S37, followed by step S38 where the sample count −− is made (decremented). Then, at step S39, it is determined whether the sample == IEC signal (IEC61937 format) or not. In the case where the sample == IEC signal at step S39, the process proceeds to step S40 for determining whether the sample count == 0 (continuous 0s) or not, and if the sample count == 0 (continuous 0s), the process proceeds to step S41. The burst sync detection is set to 1 and the process is returned, while unless the sample count == 0 or the burst sync detection is set to 0 (cleared) at step S35, the process proceeds to step S42.

At step S42, the process is advanced by one sample, followed by step S43 for sample count −− (decrement). At step S44, it is determined whether the previous Pc=Pc or not, and if the previous Pc equals Pc, the process proceeds to step S45 for determining whether Pd ==0 or not. Unless the previous Pc = Pc, the process proceeds to step S53, and setting the previous Pc equal to Pc, the process proceeds to the processing block of step S22. Also when Pd== 0 at step S45, the process proceeds to the processing block at step S22. The process of steps S20 to S53 corresponds to the data input other than zero indicated by reference numeral 31 in FIG. 3.

Unless Pd== 0 (continuous 0s) indicating the frame length at step S45, the value of each flag is set to 1 for stream detection, 0 for PCM detection and 0 for MaybePCM at step S46, and the process proceeds to step S47. It is determined at step S47 whether Pc indicating the sync pattern of the burst preamble is 1, 4, 5, 6, 8, 9, 11, 12, 13, and if Pc=1, 4, 5, 6, 8, 9, 11, 12, 13, the process proceeds to step S48 where the message is set to AC-3, dts or MPEG, followed by step S49 for setting the required transfer to 1. Then, at step S50, the stream count is set to MAX for transfer of AC-3, dts and MPEG, followed by returning to step S20. In the process, the compressed audio data of state 3 (34) shown in FIG. 3 is being decoded. Unless Pc is 1, 4, 5, 6, 8, 9, 11, 12, 13 at step S47, the process proceeds to step S51 where the message is set to UNKNOWN, followed by step S52 for setting the stream count at 0.5 sec/64, and then the process is returned to step S20. In the process, the UNKNOWN mode of state 2 (32) shown in FIG. 3 prevails.

FIG. 6 shows a subroutine of the stream check block at step S13 in FIG. 4. The stream check block of FIG. 6 is the process performed in the case where the input signal is the PCM data and the PCM data is being decoded or in UNKNOWN mode.

In FIG. 6, once the stream check block is started, it is determined at step S60 whether the sample count == 0 (continuous 0s), and if the sample count == 0, the process is returned, all while unless the sample count == 0, the process proceeds to step S61 for determining whether the burst sync has been detected or not. If the burst sync is detected at step S61, the process proceeds to step S62 where the burst sync detection is set to 0 (clear), followed by step S62 for leading one sample, the sample count is set to −− (decremented) at step S64, and it is determined whether the previous Pc == Pc or not at step S65. In the case where the previous Pc == Pc at step S65, the process proceeds to step S66, and the formatted stream is set to 1, followed by proceeding to step S45 of the formatted stream block in FIG. 5 described above, through (f). Unless the previous Pc == Pc at step S65, on the other hand, the process proceeds to step S67 for setting the previous Pc to Pc and the process returns to step S60.

Unless the burst sync is detected at step S61, the process proceeds to step S68, and leading by one sample, the sample count is set to −− (decremented) at step S69, and it is determined at step S70 whether MaybeDTS prevails or not. In the case where Maybe dts is involved at step S70, the DTS sample count is incremented (++) at step S71, while in the case where Maybe dts is not involved in step S70, the process proceeds directly to step S72 for determining whether the sample is the IEC signal (IEC61937 format) or not. In the case where the sample is the IEC signal at step S72, the PCM count is set to PCMMAX at step S73, and it is determined at step S74 whether the sample count ==0 or not. In the case where the sample count == 0, the burst sync detection is set to 1 at step S75, followed by returning the process. Unless the sample count == 0 at step S74, on the other hand, the process proceeds to step S62 described above.

In the case where the sample is not the IEC signal at step S72, the process proceeds to step S76 for determining whether the sample == DTS sync or not. In the case where the sample == DTS sync at step S76, the PCM count is set to PCMMAX at step S77, followed by step S78 for determining whether MaybeDTS is involved or not. In the case where MaybeDTS is involved at step S78, the process proceeds to step S79 for determining whether the dts sample count == 512, 1024, 2048 or 4096 or not. This operation is performed by determining whether the header appears at the same period as dts during the decoding of the data.

In the case where the DTS sample count == 512, 1024, 2048, 4096 at step S79, the previous Pc is equal to −1 at step S80, and the message is equal to DTS at step S81. Then, at step S82, the values of the flags are set to 1 for stream detection, 0 for PCM detection, 0 for MaybePCM, 0 for formatted stream, 64 less the sample count for offset, 64, 32, 16 or 8 for TDSCOUNTMAX, and DTSCOUNTMAX for DTS count. At step S83, the DTS sync is copied to the buffer memory of the decoder 9 for transfer. This indicates that the compressed audio data in state 3 (34) of FIG. 3 is being decoded. At step S84, it is determined whether the sample count == 0 (continuous 0s) or not, and if the sample count == 0, the process is returned, while unless the sample count == 0, the process proceeds to step S92 of the unformatted stream block of FIG. 7 described later through (g).

Unless the DTS sample count == 512, 1024, 2048 or 4096 at step S79, the DTS sample count is set to 0 at step S85, and the process returns to step S60.

In the case where MaybeDTS is not involved at step S78, the process proceeds to step S86 for setting the DTS sample count to 0 and MaybeDTS to 1, followed by returning to step S60.

Unless the sample == DTS sync at step S76, the process proceeds to the PCM check block at step S87 for performing the PCM detection as described later and the process is returned to step S60.

Figure 7:
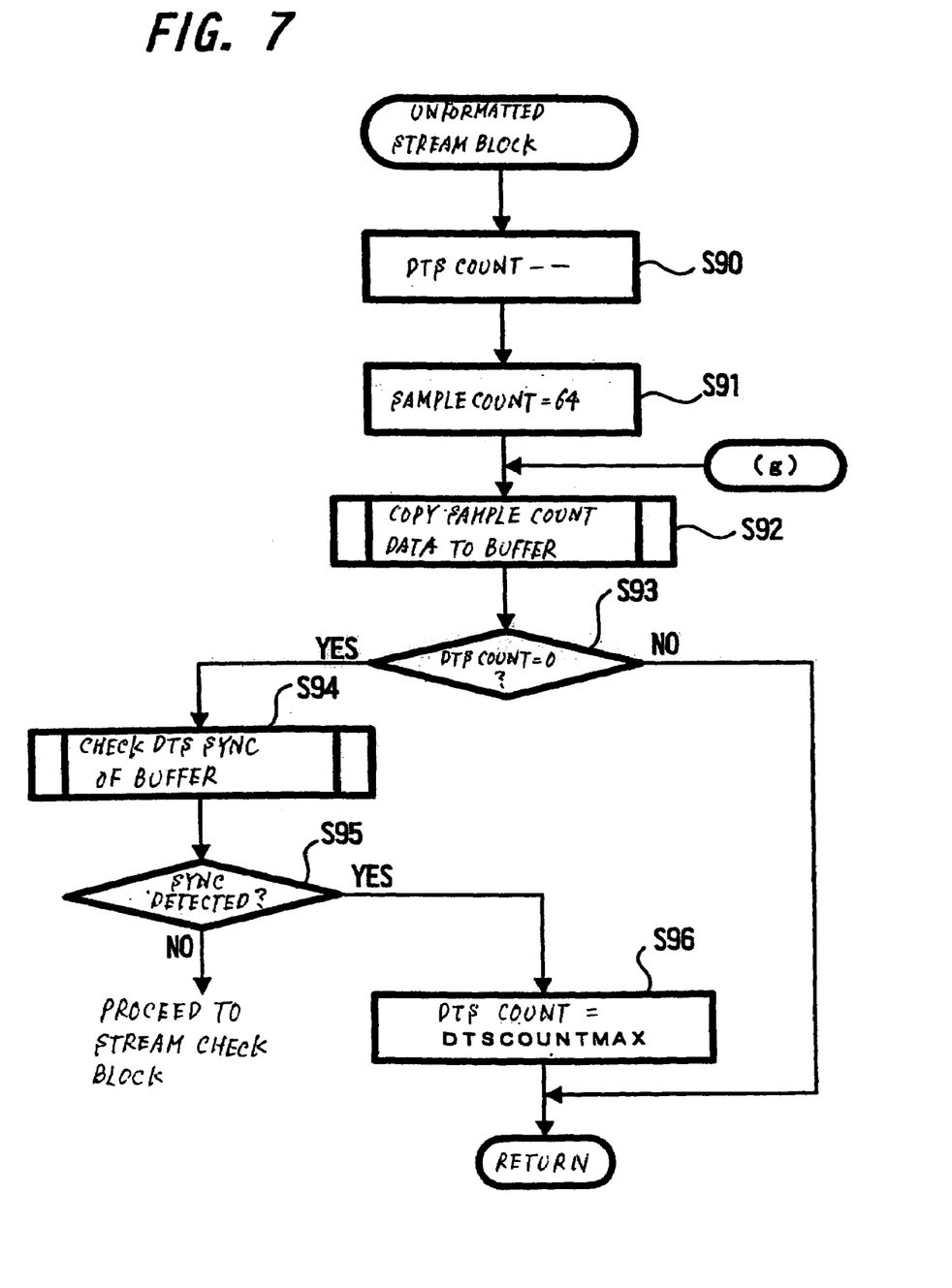
FIG. 7 is a flowchart showing the stream detecting operation (unformatted stream block) according to an embodiment of the invention.

FIG. 7 shows a subroutine of the unformatted stream block of step S5 in FIG. 4. The unformatted stream block in FIG. 7 is the process performed in the case where the input signal is not based on the DVD specification.

In FIG. 7, once the unformatted stream block is started, the DTS count is decremented (−−) at step S90, the sample count is set to 64 at step S91, and the sample count data is copied to the buffer for data retrieval at step S92.

At step S93, it is determined whether the DTS count ==0 (continuous 0s) or not, and in the case where the DTS count == 0 0, the DTS sync of the buffer is checked at step S94 thereby to check whether the DTS sync is located at the specified position or not. Upon detection of the sync at step S95, the DTS count is set to TDSCOUNTMAX at step S96 so that the stream is detected, followed by returning the process. In the case where no sync is detected at step S95, the process proceeds to the stream check block shown in FIG. 6. Unless the DTS count == 0 at step S93, the process is returned.

Figure 8:
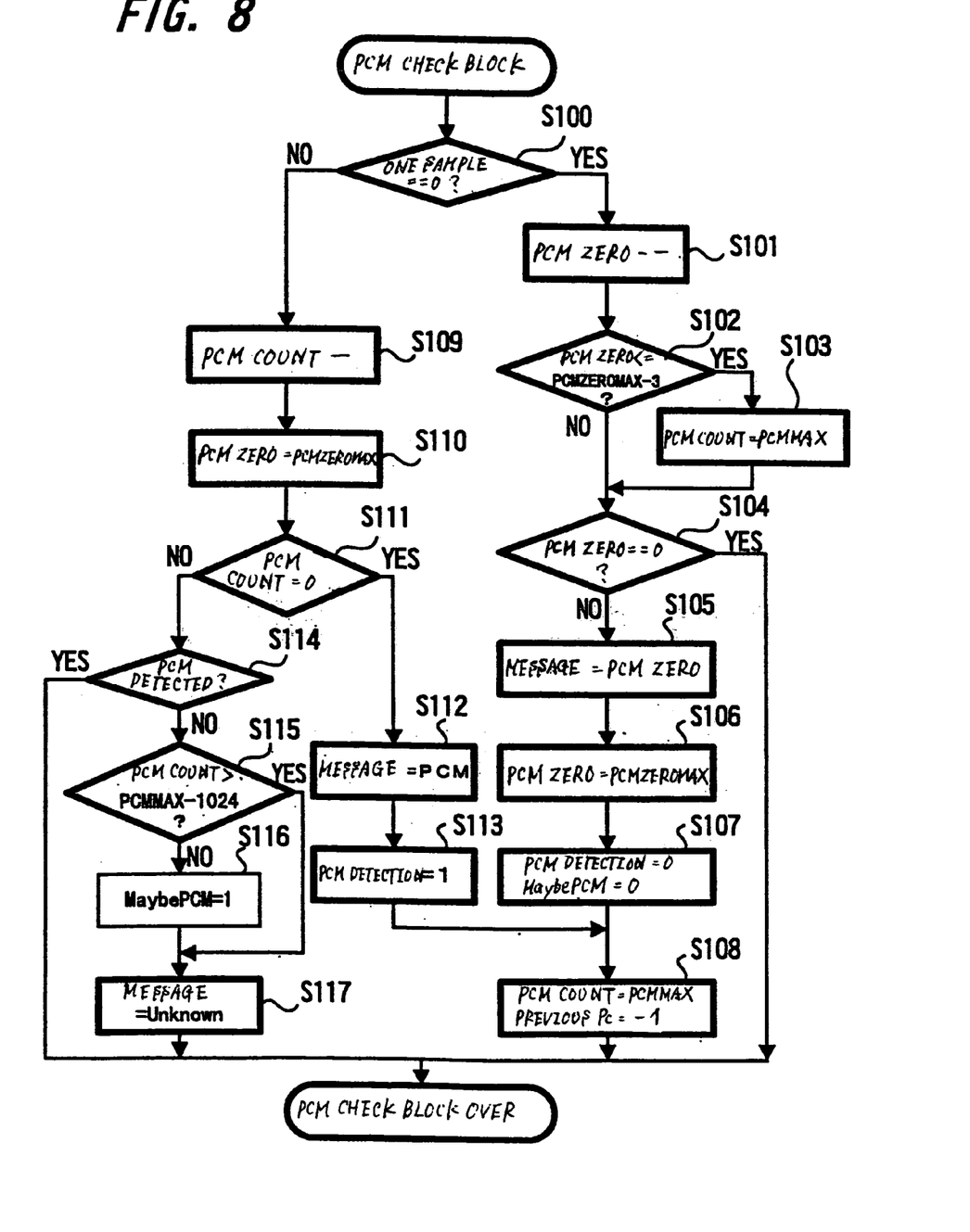
FIG. 8 is a flowchart showing the stream detecting operation (PCM check block) according to an embodiment of the invention.

FIG. 8 shows a PCM check subroutine of step S87 of the stream check block shown in FIG. 6. FIG. 8 shows the process performed in the UNKNOWN mode.

In FIG. 8, once the PCM check block is started, it is determined at step S100 whether one sample == 0 (continuous *0s) or not. If one sample == 0, the process proceeds to step S101, the PCM zero is decremented (−−) and it is determined at step S102 whether the PCM zero <=(PCMZEROMAX−3). In the case where the PCM zero <=(PCMZEROMAX−3) at step S102, on the other hand, the PCM count is set to PCMMAX at step S103, and the process proceeds to step S104. Unless the PCM zero <= (PCMZEROMAX−3) at step S102, on the other hand, the process directly proceeds to step S104. Step S102 corresponds to the zero detection for three samples in row indicated by reference numeral 36 in FIG. 3, and step S103 corresponds to the counter clear designated by 37 in FIG. 3. At step S104, it is determined whether PCM zero == 0 (continuous 0s) or not, and if PCM zero == 0, the process proceeds to step S105, and the message is set to PCM zero, so that PCM zero=PCMZEROMAX at step S106. At step S107, the PCM detection is set to 0, and MaybePCM to 0, followed by step S108 for setting the PCM count to PCMMAX and the previous Pc to −1 thereby to terminate the PCM check block zero. Unless the PCM zero == 0 at step S104, the PCM check block is directly terminated.

Unless one sample == 0 (continuous 0s) at step S100, the process proceeds to step S109 and the PCM count is decremented (−−) so that the PCM is set to PCMZEROMAX at step S110. At step S111, it is determined whether the PCM count == 0 or not. If the PCM count == 0, the process proceeds to step S112, and the message is set to PCM, followed by step S113 for setting the PCM detection to 1. Then the process proceeds to step S108 described above. Steps S115 and S116 correspond to the case where counter>1024 (PCM detection) as designated by reference numeral 38 in FIG. 3. Steps S109 and S111 correspond to the continuous zero data detection for one second indicated by reference numeral 35 or 41 in FIG. 3.

Unless the PCM count == 0 at step S111, the process proceeds to step S114 for determining whether the PCM is detected or not. In the case where the PCM is detected at step S114, the PCM check block is ended directly. If the PCM is not detected, on the other hand, the process proceeds to step S115 for determining whether PCM count>(PCMMAX−1024) or not. In the case where PCM count>(PCMMAX−1024) at step S115, the process proceeds to step S117 where the message is set to UNKNOWN and the PCM check block is ended. Unless PCM count>(PCMMAX−1024) at step S115, the process proceeds to step S116 and after setting MaybePCM to 1, proceeds to step S117.

An audio signal processing apparatus for decoding the input digital audio data and outputting an audio signal according to this embodiment comprises a decoder 9 for determining that the input signal is the digital data stream of a compressed sound upon detection of zero data which continues for at least a predetermined length of time, wherein the digital data stream is decoded by the decoder 9 and the audio signal is output. Thus, even in the case where the trick play (what is called double-speed reproduction, rapid feed or skip) is performed in the optical disk reproduction apparatus supplied with the input signal or otherwise the continuity of the input data stream is lost, the input signal is not erroneously recognized as digital audio data (PCM), and therefore noises can be prevented.

According to the embodiment described above, the optical disk can be a recordable one other than the DVD.

In the audio signal processing method according to the invention, it is determined whether the zero data continues in the supplied data for a predetermined length of time or not, and in the case where the zero data continues for the predetermined length of time, it is determined that the audio data is involved, and the supplied data are decoded. Therefore, even in the case where the trick play (what is called double-speed reproduction, rapid feed or skip) is performed in the optical disk reproduction apparatus (DVD player) supplied with the input signal or otherwise the continuity of the input data stream is lost, the input signal is not erroneously recognized as digital audio data (PCM), and therefore noises can be prevented.

In the audio signal processing method according to this invention described above, upon detection of the continuous zero data for the predetermined period of time, the data supplied is switched to the decode operation based on the sync signal for the supplied data. Even in the case where an input signal of new format having a different sync signal specification appears, therefore, it is determined that the input signal is the compressed audio digital data as long as the continuous zero data exceeding the predetermined period of time exists in the compressed audio data. Thus, the erroneous recognition of the input signal as digital audio data (PCM) is prevented, thereby making it possible to prevent the noises.

Also, with the audio signal processing method according to the invention described above, in the case where the continuous zero data for the predetermined period of time are not detected, it is determined that the non-compressed audio data is involved and the decode operation is performed. Therefore, the PCM detection can be carried out without resorting to the PCM flag unlike in the prior art. Also, even in the case where the digital data interrupted randomly regardless of the stream are output as PCM data in such an operation as rapid feed of the optical disk having the audio data recorded therein according to the dts scheme handled as the normal CD, it is determined from the detection of continuous zero data that the compressed audio data are involved. In this way, at least it is determined that the PCM is not involved, thereby making it possible to prevent noises.

Also, in the audio signal processing method according to this invention described above, the supplied audio data are stored for the predetermined period during the detection whether the zero data are continuously detected or not, and in the case where it is determined that the non-compressed audio data prevails, the result of decoding the supplied data is output following the result of decoding the stored audio data is output. Without discontinuation of the output data, therefore, the audio data of PCM scheme can be reproduced.

Further, in the audio signal processing method according to this invention described above, the output of the decoded data is muted for the predetermined period of time during which it is detected whether the continuous zero data exist or not. Therefore, the noises can be prevented by muting the output while the determination on the input data is impossible.

Furthermore, with the audio signal processing method according to the invention described above, in the case where the data supplied during the decode operation is the continuous zero data, the detect operation is performed again for determining whether the zero data continues for the predetermined period of time. Therefore, the state in which nothing is reproduced in the optical disk reproduction apparatus is detected and noises can be prevented.

Also, the audio signal processing apparatus according to this invention described above comprises detection means for detecting whether the supplied data contain continuous zeros for a predetermined period of time, and determining means for determining that the supplied data is the compressed audio data in the case where the detection result of the detection means indicates that the continuous zero data exist for the predetermined period of time, and decode means for decoding the supplied data based on the result of determination by the determining means. In the case where the trick play (double-speed reproduction, rapid feed or skip) is performed in the optical disk reproduction apparatus (DVD player) for supplying the input signal or otherwise in the case where the input data stream comes to lose the continuity, the erroneous recognition that the input signal is the digital audio data (PCM) is eliminated, thereby making it possible to prevent noises.

Also, with the audio signal processing apparatus according to the invention described above, upon detection by the detection means that the continuous zero data exist for the predetermined period of time, the decode operation is switched based on the sync signal of the supplied data, and the supplied data are decoded. Even in the case where an input signal of new format appears with a different sync signal specification, it is determined that the input signal is the compressed audio digital data as long as the continuous zero data exists for a time longer than a predetermined period of time in the digital compressed audio data. Thus, the erroneous recognition that the input signal is the digital audio data (PCM) can be prevented.

Further, with the audio signal processing apparatus according to the invention described above, in the case where the continuous zero data are not detected during the predetermined period of time, the determining means determines that the non-compressed audio data are involved. Therefore, the PCM detection can be performed without resorting to the PCM flag unlike in the prior art. Also, even in the case where digital data randomly interrupted without regard to the stream are output as PCM data during the rapid feed of the optical disk having recorded therein audio data according to the dts scheme handled as a normal CD, it is determined that the compressed audio data is involved based on the detection of the continuous zero data. By determining at least that the PCM is not involved, therefore, noises are prevented.

Also, with the audio signal processing apparatus according to the invention described above, the decode means includes a memory for storing the audio data supplied for the predetermined period of time during which it is detected whether the continuous zero data are detected or not. Upon determination that the non-compressed audio data are involved, the apparatus outputs the data decoded from the supplied data as the continuous output decoded by the decode means from the audio data stored in the memory. Therefore, by storing the data corresponding to the past samples for the predetermined period of time, the audio data of PCM scheme can be reproduced without interruption of the output data.

Further, the audio signal processing apparatus according to the invention described above comprises muting means for muting the output of the data decoded for the predetermined period of time during which it is determined whether the continuous zero data are detected, and therefore the output with the input data impossible to determine is muted thereby to prevent noises.

Also, with the audio signal processing apparatus according to the invention described above, the muting means cancels the muting operation with the start of the decode operation by the decode means. Therefore, the smooth audio output can be started with the decode operation started based on the input data determination, thereby preventing noises.

Further, with the audio signal processing apparatus according to the invention described above, in the case where the data supplied during the decode operation by the decode means is the continuous zero data, the detection means again detects the data supplied. Therefore, the state in which nothing is reproduced in the optical disk reproduction apparatus is continuously detected, thereby preventing noises.

The apparatus is used for the decode operation for suppressing the noises of the audio data supplied to the decoder unit from an optical disk apparatus outputting the audio signal read by an optical pickup from a disk (DVD).

What is claimed is:

1. An audio data signal processing method, in which a supplied audio data signal can be in one of a compressed data state and an uncompressed data state, for performing a process for decoding the supplied audio data signal, comprising the steps of:
   detecting whether zero data continues for a predetermined period of time in said supplied audio data signal;
   determining, when zero data are detected to continue for said predetermined period of time, that said supplied audio data are in the compressed data state and determining, when zero data is not detected to continue for said predetermined period of time, that said supplied audio data are in the uncompressed state;
   performing a first decoding operation on said supplied audio data when said supplied audio data are determined to be in the compressed data state in said step of determining; and
   performing a second decoding operation on said supplied audio data when said supplied audio data are determined to be in the uncompressed data state in said step of determining,
   wherein upon detection that zero data continue for said predetermined period of time, said decoding is performed by automatically switching said supplied audio data signal to said first decoding operation based on a sync signal of said supplied audio data signal, and
   wherein said supplied audio data are stored for said predetermined period during which it is detected whether said zero data continue.

2. The audio signal processing method described in claim 1, wherein the output of said decoding operation is muted for said predetermined period of time during which it is detected whether zero data continue for said predetermined period of time.

3. The audio signal processing method described in claim 1, wherein when said data supplied during said decode operation are continuous zero data, the operation for detecting whether said zero data continue for said predetermined period of time is repeated.

4. An audio signal processing apparatus comprising:
   detection means for detecting whether zero data continue for a predetermined period of time in supplied audio data;
   determining means for determining that said supplied audio data is compressed audio data when a result of detection by said detection means is that zero data continues for said predetermined period of time; and
   decoding means for decoding said supplied audio data based on the result of said determination by said determining means,
   wherein when said detection means detects that zero data continue for said predetermined period of time, said decoding means switches to a first decoding based on a sync signal of said supplied data and decodes said supplied audio data, and
   wherein said determining means determines that said supplied audio data are uncompressed audio data when zero data are not detected continuously for said predetermined period of time and said decoding means automatically switches to a second decoding and decodes said supplied audio data,
   wherein said decoding means includes a memory for storing said supplied audio data for said predetermined period of time during which it is determined whether zero data are continuously detected.

* * * * *